United States Patent [19]
Wentworth, Jr.

[11] 4,197,531
[45] Apr. 8, 1980

[54] MECHANICAL SEAL LEAKAGE ALARM

[75] Inventor: Robert S. Wentworth, Jr., Temecula, Calif.

[73] Assignee: Borg-Warner Corporation, Chicago, Ill.

[21] Appl. No.: 900,628

[22] Filed: Apr. 27, 1978

[51] Int. Cl.² .............................................. G08B 21/00
[52] U.S. Cl. ........................................ 340/605; 73/40
[58] Field of Search ...................... 340/605, 611, 626; 73/40, 40.5 R, 46

[56] References Cited
FOREIGN PATENT DOCUMENTS
2412373  8/1975  Fed. Rep. of Germany ........... 340/605

Primary Examiner—Alvin H. Waring
Attorney, Agent, or Firm—Aubrey L. Burgess

[57] ABSTRACT

An alarm system for indicating excessive leakage of liquid across the engaging seal faces of a mechanical seal, especially those seals which are so positioned to prevent visual inspection.

7 Claims, 5 Drawing Figures

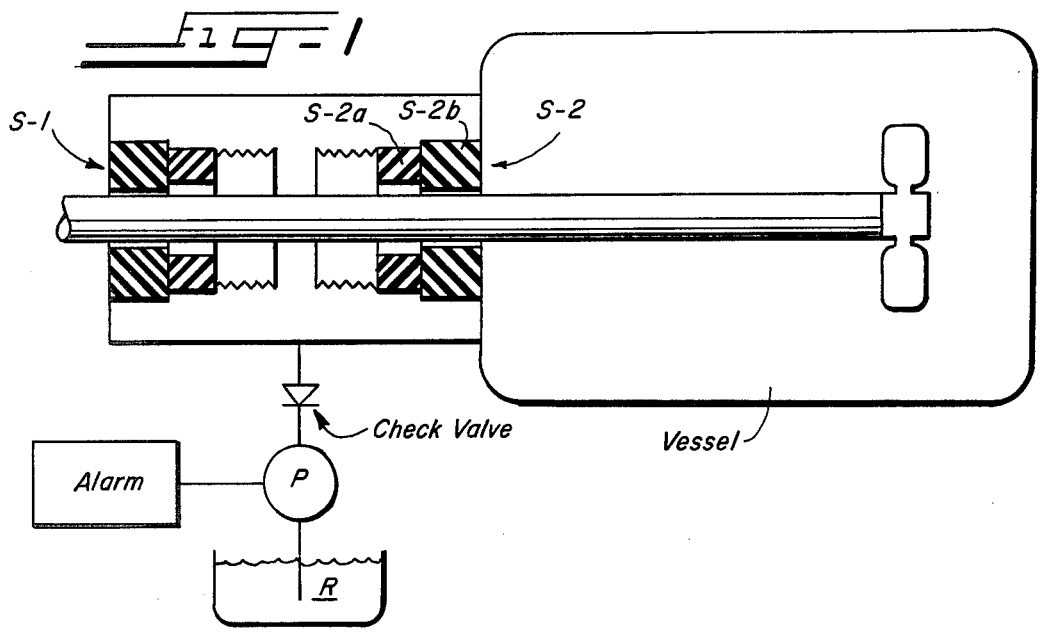
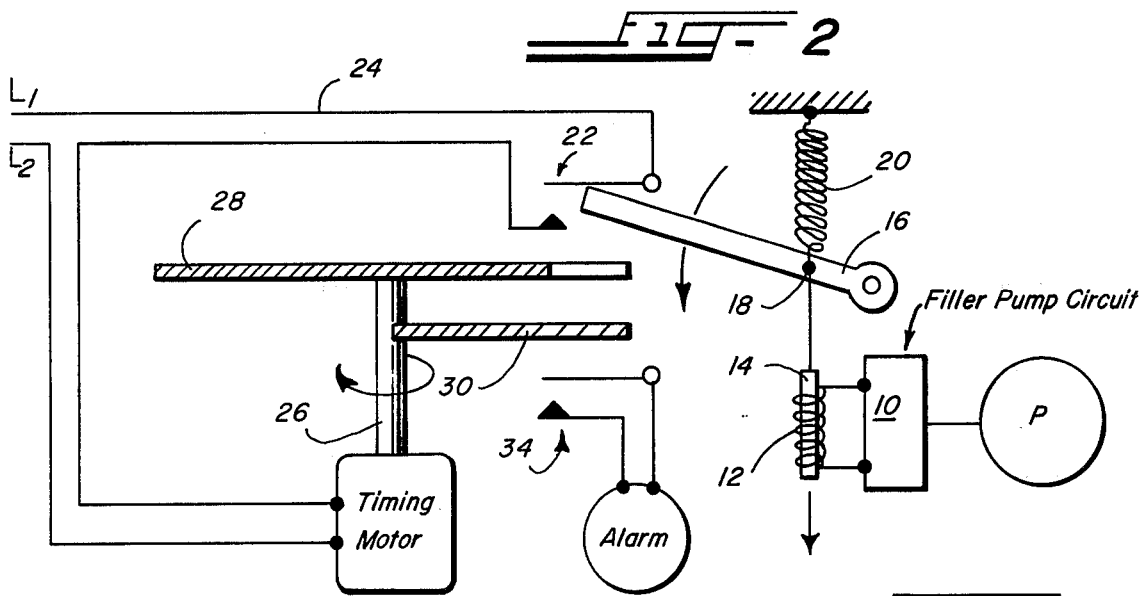
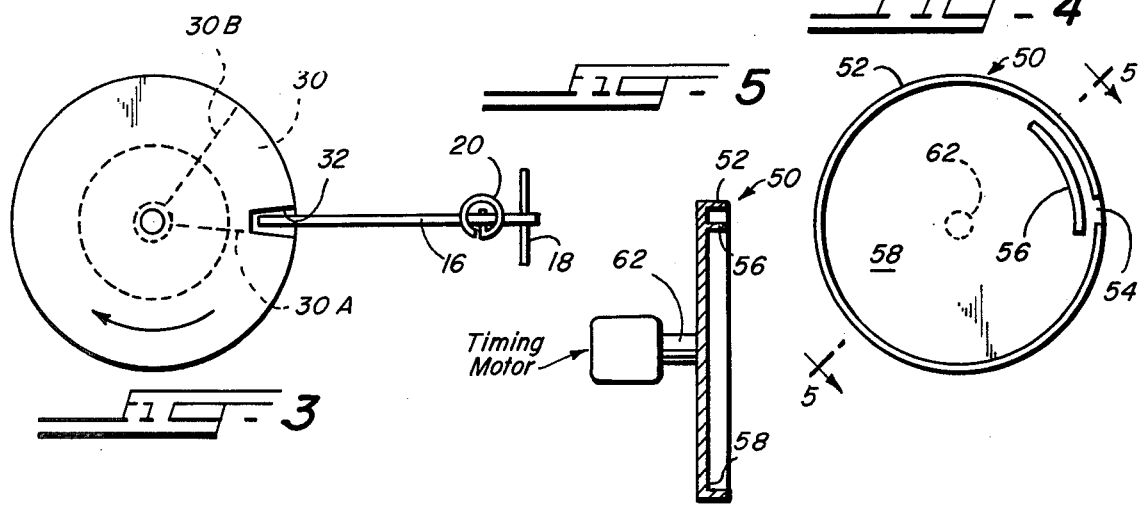

MECHANICAL SEAL LEAKAGE ALARM

BACKGROUND OF THE INVENTION

It is sometimes required to pass a rotating shaft through the wall of a vessel containing a fluid which, for reasons of hazard or expense cannot be permitted to leak to atmosphere even in small amounts. Since there is, inherently, some leakage with any mechanical seal it is a common practice in such cases to use mechanical seals in pairs while supplying a harmless barrier fluid to the cavity between them. The fluid is maintained at a pressure slightly higher than the pressure of the hazardous or expensive fluid. By this means it is assured that any leakage to atmopshere is only the inexpensive or harmless barrier fluid. To ensure maintenance of adequate pressure and make up for normal leakage of barrier fluid (both to atmosphere and into the vessel) various supply systems are employed. Commonly this involves the use of an electric pump activated by a low pressure sensing switch. Should pressure drop below a preset level the pump will supply fluid from a simple reservoir.

Serious failure of a seal is usually preceded by a sudden increase inleakage rate. With a double seal leakage to atmosphere is readily seen, leakage into the sealed vessel is hidden and might not be detected until the barrier fluid was heavily contaminated with the vessel fluid and therefore escaping to atmosphere with the normal leakage of the outermost seal.

THE INVENTION

An electro-mechanical alarm system is described herein which senses, by means of the operation of the filler pump, excessive leakage across either seal face of a double mechanical seal. Generally the filler pump operates at similar intervals of time for similar lengths of time. When th operational lengths of time are in excess of the norm, abnormal or excessive leakage is indicated. By sensing variations in this time, incipient seal failure as well as pump wear and piping leaks are detected at an early stage.

The system comprises the combination of various switches together with a timing means to detect the abnormal operation of the filler pump which is indicative of excessive leakage across the seal faces or other problems requiring an operator's attention, and to actuate the alarm when this condition is detected.

The electro-mechanical alarm system of this invention is not affected by stray currents from pumps and other machinery which could affect the operation of more sophisticated integrated circuits. It is an improvement over directly actuated switch/cam circuits with or without relays in that a minimum number of switch contacts are relied upon and switch failure in this device will not influence the system being protected.

THE DRAWINGS

FIG. 1 is a schematic illustration of a typical system in which this invention is used;

FIG. 2 is a schematic and sectional view illustration of apparatus according to this invention;

FIG. 3 is a top plan view of the mechanical parts of the apparatus of this invention;

FIG. 4 is a side view of another embodiment of the invention; and

FIG. 5 is a sectional view taken on line 4—4 of FIG. 4.

DETAILED DESCRIPTION

Attention is invited to FIG. 1 of the drawings which illustrates the use of this invention in a typical system comprising a double mechanical seal, S-1 and S2, one of which (S-2) is so situated with respect to the vessel V as to preclude its inspection to determine whether or not there is excessive leakage across the seal faces S-2a and S-2B. Barrier fluid from a reservoir R is supplied to the seals by a filler pump P through a check valve C. The filler pump P is a typical system provides fluid to the seal cavity; its operation is initiated by a pressure sensitive switch in a typical system. The pump P runs for a length of time necessary to bring the pressure of the liquid in the cavity to that of the shut off setting of the pressure switch. Leakage across the seal faces occurs over a period of time; if leakage is excessive, the pump P must operate with abnormal frequency. To sense abnormal pump operation, the alarm system A of this invention is associated with the pump P. Details of the alarm system A are illustrated in FIGS. 2 to 5, inclusive.

When the pump P is started and when operating, the systems filler pump circuit 10 is actuated which in turn actuates the winding of a solenoid 12 which is connected to this circuit.

The winding of the solenoid upon actuation draws a core 14 into winding. The core 14 is connected to a lever 16 pivotable about a fixed pivot member 18, the lever being normally maintained in the position illustrated in FIG. 2 by a spring 20. When the core 14 is drawn into the winding of the solenoid 12, the lever 16 is pivoted about the pivot member 18. The lever 16, in its normal position holds a normally closed switch 22 open. The switch 22 is a timer motor circuit 24 connected to line voltage at $L^1$ and $L^2$. When the lever 16 is pulled downwardly, normally closed circuit 22 is permitted to close completing the circuit 24 to activate the timing motor TM. The timing motor's shaft 26 is connected to an upper plate 28 and a lower plate 30. The plate 28 is circular in plan while the plate 30 is but a segment of a circle. The plate 28 has a notch 32 opening to its periphery which is of such size to permit passage of one end of the lever 16. The leading edge 30A of the lower plate 30 is directly below the notch 32. Also below the plate 30 is a normally open switch 34 in an alarm circuit 36 which when closed activates an alarm A.

When the lever 16 is pulled downwardly, the end passes through the notch 32 in the plate 28. The plate 30 prevents further downward movement of the lever 16 to the extent that the switch 34 remains open. However, the arc of the plate 30 represents a time interval which corresponds to somewhat more than the maximum length of time the pump P should operate. While the circumference of plate 28 represents the minimum acceptable time between operating periods.

Thus if the pump P operates at or below the normal length of time generally required for filing the seal cavity, the circuit 10 is inactivated when the pump closes to run and the solenoid winding is inactivated. The core 14 is no longer held in the winding and it with the lever are urged upwardly by the spring 20. However, the lever is free to pass upwardly through the notch 32 only after a revolution of the plate 28. If the pump P operates before this time and after the arc of plate 30 is clear it is indicative of excessive leakage across seal faces or pump problems and the lever 16 is pulled downwardly at the trailing edge 30B of the plate 30, closing the switch 34 activating the alarm circuit 36 and activating the alarm A. Timer motor speed is chosen such that a full revolution of plate 28 represents s reasonable period for which the seal cavity should hold pressure below upper and lower limits of its pressure switch. In normal operation, the time will continue until lever 16 is pulled through notch 32 to open switch 22 and shut off the timer until the next normal filling period.

Attention is now invited to FIGS. 4 and 5 of the drawing which illustrate cam means 50 replacing the plates 28 and 30. The cam means comprises a cam ring 52 having a gap or notch 54 which corresponds to the disc 28 and notch 32 of the first embodiment, and a cam segment 56 below the ring 52 which corresponds to the plate 30. The ring 52 and segment 56 are mounted on a common substantially vertically positioned back plate 58 fixed to a substantially horizontal shaft 62 which is rotated by the timing motor TM. As readily understood the operation is essentially similar to that described with reference to FIGS. 1 and 2.

Other types of cam followers may be used with rotating cam means without departing from the spirit of the invention.

What is claimed is:

1. Apparatus for use with a mechanical seal in a cavity to indicate excessive leakage of liquid across the engaging seal faces thereof comprising:
   a filler pump for supplying liquid to said seal cavity, said filler pump operating normally at intervals for predetermined lengths of time;
   a timing means and a timing circuit therefor;
   first switch means in said timing circuit to complete said circuit and thus actuate said timing means;
   alarm means and a circuit therefor;
   second switch means in said alarm ciruit to complete the alarm circuit causing actuation of said alarm means;
   a filler pump circuit and actuating means therein actuated when said filler pump operates, permitting said first switch means to complete said timing circuit during operational periods of said pump;
   said timing means being so constructed and arranged to permit said actuating means to actuate said first switch means when said pump operates for actuating said second switch means when said pump operates for abnormal periods of time indicative of excessive leakage of liquid across the engaging seal faces to thus complete said alarm circuit and actuate said alarm.

2. Apparatus as recited in claim 1 wherein said first switch means is normally closed and said second switch means is normally open and said actuating means permitting said first switch means to close and closing said second switch means when said pump operates for abnormal periods of time.

3. Apparatus as recited in claim 2 wherein said actuating means comprises a pivoted lever and a solenoid, said solenoid being connected in said filler pump circuit and being energized when said filler pump operates.

4. Apparatus as recited in claim 3 wherein said timing means comprises a timing motor, a first rotatable means and an axially spaced rotatable segment, said first rotatable means having a slotted edge permitting said lever to pass therethrough, said segment being of such size to correspond to a normal period of pump operation and preventing movement of said lever to actuate said second switch means for said normal period of pump operation.

5. Apparatus comprising a pair of mechanical seals one being located in a vessel containing a fluid, the excape of which fluid to the atmosphere is undesirable;
   a cavity between the mechanical seals;
   pump means to supply a second fluid to said cavity under a pressure in excessive to that of the fluid in said vessel;
   said pump normally operating at similar intervals of time for similar lengths of time;
   means sensing variations in pump operating time to detect leakage of vessel fluid across said one of said mechanical seals which is abnormal and above a predetermined valve; and
   means preventing the leakage of said vessel fluid to said atmosphere.

6. Apparatus as recited in claim 5 wherein said detecting means comprises an alarm system.

7. Apparatus as recited in claim 6 wherein said alarm system is an electro-mechanical system.

* * * * *

UNITED STATES PATENT AND TRADEMARK OFFICE
CERTIFICATE OF CORRECTION

PATENT NO. : 4,197,531
DATED : April 8, 1980
INVENTOR(S) : ROBERT S. WENTWORTH JR.

It is certified that error appears in the above—identified patent and that said Letters Patent is hereby corrected as shown below:

Column 1, line 39, cancel "th" and insert -- the --.

Column 2, line 7, cancel "S2" and insert -- S-2 --.

line 13, cancel "is" and insert -- in --.

Column 4, line 28, cancel "excape" and insert -- escape -- line 31, cancel "excessive" and insert

-- excess --.

Signed and Sealed this

Eighth Day of July 1980

[SEAL]

Attest:

SIDNEY A. DIAMOND

Attesting Officer  Commissioner of Patents and Trademarks